(12) United States Patent
Saiki et al.

(10) Patent No.: US 9,646,754 B2
(45) Date of Patent: May 9, 2017

(54) LINEAR SOLENOID

(71) Applicant: DENSO CORPORATION, Kariya, Aichi-pref. (JP)

(72) Inventors: Katsuhiro Saiki, Kitanagoya (JP); Akinori Hirano, Nagoya (JP); Shinichi Kondo, Okazaki (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/740,600

(22) Filed: Jun. 16, 2015

(65) Prior Publication Data
US 2015/0380143 A1    Dec. 31, 2015

(30) Foreign Application Priority Data

Jun. 25, 2014 (JP) .................. 2014-130308

(51) Int. Cl.
| | |
|---|---|
| *H01F 3/00* | (2006.01) |
| *H01F 7/16* | (2006.01) |
| *H01F 7/129* | (2006.01) |
| *F16K 31/06* | (2006.01) |
| *H01F 7/08* | (2006.01) |
| *F16K 27/02* | (2006.01) |

(52) U.S. Cl.
CPC ......... *H01F 7/1607* (2013.01); *F16K 27/029* (2013.01); *F16K 31/0668* (2013.01); *F16K 31/0675* (2013.01); *F16K 31/0693* (2013.01); *H01F 7/081* (2013.01); *H01F 7/129* (2013.01); *H01F 2007/086* (2013.01)

(58) Field of Classification Search
CPC .......... H01F 7/1607; H01F 7/16; H01F 7/129; H01F 2007/085; F16K 31/06; F16K 31/02
USPC .......................................................... 335/279
See application file for complete search history.

(56) References Cited

U.S. PATENT DOCUMENTS

| | | | | |
|---|---|---|---|---|
| 5,238,222 A | * | 8/1993 | Sumida | .................... F02M 3/07 251/118 |
| 6,076,550 A | * | 6/2000 | Hiraishi | ............... F16K 31/0655 137/550 |
| 6,179,005 B1 | * | 1/2001 | Inami | .................. F16K 31/0613 137/625.65 |

(Continued)

FOREIGN PATENT DOCUMENTS

| | | |
|---|---|---|
| JP | 06-041106 | 5/1994 |
| JP | 2004-028300 | 1/2004 |

*Primary Examiner* — Shawki S Ismail
*Assistant Examiner* — Lisa Homza
(74) *Attorney, Agent, or Firm* — Nixon & Vanderhye P.C.

(57) ABSTRACT

A linear solenoid has a coil assembly, a plunger, a stator core, and an elastic member. The coil assembly has a coil provided by a conducting wire. The plunger is disposed inside of the coil assembly and is movable in an axial direction. The stator core has a guiding portion guiding the plunger to move in the axial direction, an attracting portion attracting the plunger by generating a magnetic attractive force when the coil is energized, and a blocking portion blocking a magnetic field between the guiding portion and the attracting portion. The elastic member has an annular shape and is disposed between the blocking portion and the coil assembly. The elastic member is in contact with both an outer wall surface of the blocking portion and an inner wall surface of the coil assembly entirely in a circumferential direction of the elastic member.

6 Claims, 5 Drawing Sheets

(56) References Cited

U.S. PATENT DOCUMENTS

| | | | | |
|---|---|---|---|---|
| 6,206,343 B1* | 3/2001 | Kato | F16K 31/0613 | 251/129.15 |
| 6,752,371 B2* | 6/2004 | Herbert | E03D 5/10 | 251/129.17 |
| 6,932,316 B2* | 8/2005 | Herbert | F16K 7/14 | 251/129.07 |
| 6,948,697 B2* | 9/2005 | Herbert | F16K 31/0672 | 251/129.04 |
| 7,350,763 B2* | 4/2008 | Hofling | F16K 31/0606 | 251/129.15 |
| 8,143,984 B2* | 3/2012 | Nagasaki | F16K 31/0675 | 335/220 |
| 8,154,370 B2* | 4/2012 | Ishibashi | H01F 7/081 | 251/129.15 |
| 8,258,904 B2* | 9/2012 | Ben-Asher | H01F 7/1615 | 251/129.01 |
| 8,264,312 B2* | 9/2012 | Hamaoka | F16K 27/029 | 335/255 |
| 8,736,409 B2* | 5/2014 | Mita | F16K 31/0627 | 251/129.15 |
| 8,814,136 B2* | 8/2014 | Mizui | F16K 31/06 | 251/129.15 |
| 8,882,079 B2* | 11/2014 | Kondo | F01L 1/34 | 251/129.15 |
| 8,925,508 B2* | 1/2015 | Matsumoto | H02K 41/02 | 123/90.15 |
| 2002/0139951 A1* | 10/2002 | Kawamura | F16K 31/0613 | 251/129.15 |
| 2005/0184841 A1* | 8/2005 | Ryuen | F16K 31/0631 | 335/220 |
| 2006/0000994 A1* | 1/2006 | Kondo | F16K 31/0613 | 251/129.15 |
| 2006/0017535 A1* | 1/2006 | Nagasaki | H01F 7/1607 | 335/220 |
| 2006/0243938 A1* | 11/2006 | Ishibashi | F16K 31/0613 | 251/129.15 |
| 2007/0057217 A1* | 3/2007 | Kamidate | F16K 31/061 | 251/129.15 |
| 2007/0075283 A1* | 4/2007 | Hirano | F16K 31/061 | 251/11 |
| 2007/0158604 A1* | 7/2007 | Kondo | F16K 31/061 | 251/129.15 |
| 2007/0158606 A1* | 7/2007 | Oishi | F16K 31/061 | 251/129.15 |
| 2008/0047617 A1* | 2/2008 | Hirano | F15B 13/0402 | 137/487.5 |
| 2008/0308757 A1* | 12/2008 | Nakai | F16H 61/0251 | 251/129.15 |
| 2009/0014076 A1* | 1/2009 | Hirano | F16K 31/426 | 137/625.6 |
| 2009/0026399 A1* | 1/2009 | Ishibashi | F16K 31/0613 | 251/129.15 |
| 2009/0032752 A1* | 2/2009 | Nagasaki | F16K 31/06 | 251/129.15 |
| 2009/0032753 A1* | 2/2009 | Ishibashi | H01F 7/081 | 251/129.15 |
| 2009/0039992 A1* | 2/2009 | Ryuen | H01F 7/081 | 335/255 |
| 2009/0140189 A1* | 6/2009 | Kokubu | F16K 31/0613 | 251/129.15 |
| 2010/0308244 A1* | 12/2010 | Oikawa | F16K 11/0716 | 251/129.15 |
| 2011/0128104 A1* | 6/2011 | Yasoshima | H01F 7/127 | 335/297 |
| 2011/0147630 A1* | 6/2011 | Nisinosono | F16K 31/06 | 251/129.15 |
| 2011/0148555 A1* | 6/2011 | Sasao | H01F 7/1607 | 335/262 |
| 2012/0126158 A1* | 5/2012 | Yasoshima | F16K 31/0613 | 251/129.15 |
| 2012/0154079 A1* | 6/2012 | Sasao | H01F 7/128 | 335/278 |
| 2012/0199771 A1* | 8/2012 | Kasagi | F16K 31/0613 | 251/129.15 |
| 2013/0248743 A1* | 9/2013 | Kasagi | F16K 31/0613 | 251/129.15 |
| 2014/0145100 A1* | 5/2014 | Ishibashi | F16K 39/024 | 251/129.15 |
| 2014/0145101 A1* | 5/2014 | Ishibashi | F02M 21/0239 | 251/129.15 |
| 2014/0166915 A1* | 6/2014 | Ishibashi | F02M 21/0239 | 251/129.15 |

* cited by examiner

LINEAR SOLENOID

CROSS REFERENCE TO RELATED APPLICATION

This application is based on Japanese Patent Application No. 2014-130308 filed on Jun. 25, 2014, the disclosure of which is incorporated herein by reference in its entirety.

TECHNICAL FIELD

The present disclosure relates to a linear solenoid.

BACKGROUND

Conventionally, a linear solenoid is known to have a stator core having a tubular guiding portion, an attracting portion, and a blocking portion. The tubular guiding portion guides a plunger to move in an axial direction. The attracting portion attracts the plunger by generating a magnetic attractive force when a coil is energized. The blocking portion blocks a magnetic field between the guiding portion and the attracting portion. The guiding portion, the attracting portion, and the blocking portion are integrally coupled with each other to constitute the stator core. By integrally providing the guiding portion and the attracting portion, the guiding portion and the attracting portion can be more certainly provided coaxially, and a clearance between the plunger and the attracting portion in a radial direction can be smaller as much as possible.

In a linear solenoid described in Patent Document 1 (JP 2006-307984 A corresponding to US 2006/0243938 A1), a stator core has a thin portion provided by being recessed radial-inward, and the thin portion provides a blocking portion. Accordingly, the blocking portion can be thinner.

According to studies conducted by the inventors of the present disclosure, the linear solenoid of Patent Document 1 has a communication passage through which an interior space and an exterior space communicate with each other. When a plunger moves in an axial direction, a volume of the interior space is varied. By defining the communication passage, the linear solenoid adapts a variation of volume of the interior space. The communication passage is defined by a clearance between the stator core and a bottom of a yoke that has a bottomed-tubular shape and a clearance between a tubular portion of the yoke and a molding resin of a coil.

However, the communication passage communicates with a clearance defined between the stator core and a bobbin located inside of the coil. As a result, a foreign material such as metal powder may come from the exterior space into a recessed portion defined on an outer side of the blocking portion of the stator core. When magnetic particles such as the metal powder are accumulated at a bottom of the recessed portion, or when the magnetic particles are adhered to an inner wall of the bobbin to bridge the guiding portion and the attracting portion, a magnetic flux (i.e., a leakage flux) traveling between the guiding portion and the attracting portion while bypassing the plunger increases. Accordingly, magnetic attractive force of the stator core may decrease.

SUMMARY

The present disclosure addresses the above issues. Thus, it is an objective of the present disclosure to provide a linear solenoid with which a decrease of magnetic attractive force of a stator core can be suppressed.

A linear solenoid of the present disclosure has a coil assembly, a plunger, a stator core, and an elastic member. The coil assembly has a coil that is provided by a conducting wire. The plunger is disposed inside of the coil assembly and is movable in an axial direction. The stator core has a guiding portion, an attracting portion, and a blocking portion. The guiding portion fits to an outer surface of the plunger and guides the plunger to move in the axial direction. The attracting portion attracts the plunger by generating a magnetic attractive force when the coil is energized. The blocking portion blocks a magnetic field between the guiding portion and the attracting portion. The elastic member has an annular shape and is disposed between the blocking portion and the coil assembly. The elastic member has a radial-inner periphery being in contact with an outer wall surface of the blocking portion entirely in a circumferential direction of the elastic member and a radial-outer periphery being in contact with an inner wall surface of the coil assembly entirely in the circumferential direction.

By the above-described configuration, foreign materials coming into a clearance defined between the coil assembly and the stator core through a communication passage can be prevented from accumulating on the outer wall surface of the blocking portion or adhering on an inner wall surface of a bobbin to bridge the guiding portion and the attracting portion. Therefore, magnetic flux traveling between the guiding portion and the attracting portion while bypassing the plunger can be prevented from increasing, and a decrease of magnetic attractive force of the stator can be suppressed.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiment

An embodiment of the present disclosure will be described hereafter referring to drawings.

Figure 1:
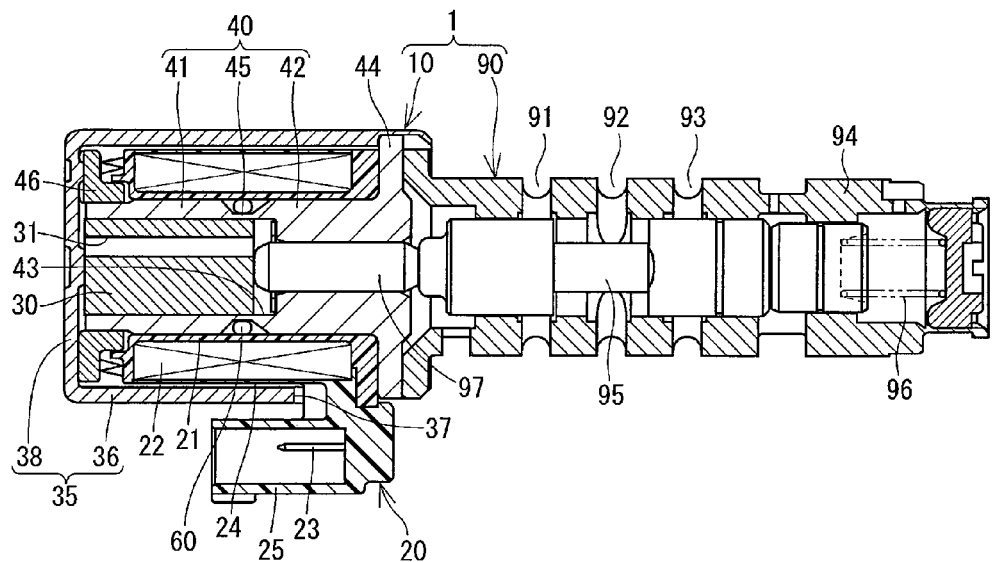
FIG. 1 is a sectional view illustrating a hydraulic control valve having a linear solenoid of a first embodiment.

A linear solenoid of the present embodiment is used in a hydraulic control valve 1 shown in FIG. 1. The hydraulic control valve 1 is disposed in a hydraulic circuit of an automatic transmission for a vehicle and used in an environment in which the hydraulic control valve 1 is exposed to hydraulic oil or used on a condition where the hydraulic control valve 1 is soaked in hydraulic oil.

Figure 2:
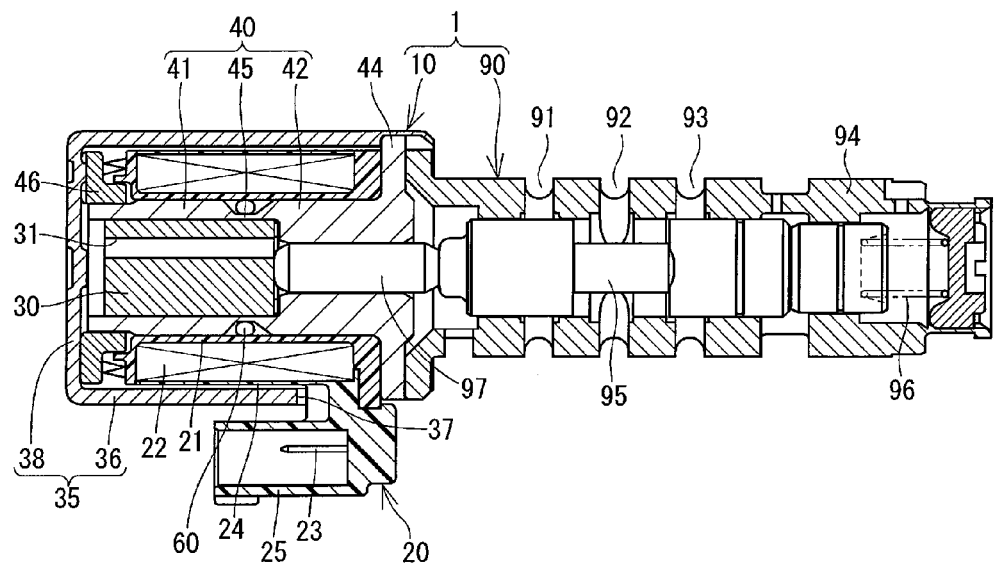
FIG. 2 is a sectional view illustrating the hydraulic control valve on a condition that a plunger is magnetically attracted by energizing a coil.

A schematic configuration of the hydraulic control valve 1 will be described referring to FIGS. 1 to 3.

As shown in FIG. 1, the hydraulic control valve 1 has a spool valve 90 and a linear solenoid 10 operating the spool valve 90.

The spool valve 90 has a sleeve 94, a spool 95, and a spring 96. The sleeve 94 has a tubular shape and is provided with oil ports 91, 92, 93. The spool 95 is disposed in the sleeve 94 to be movable in an axial direction. The spool 95 opens or closes the oil ports 91, 92, 93 by changing location in the axial direction. The spring 96 has a well-known configuration to bias the spool 95 in the axial direction. The spool 95 has an end portion that is opposite to the other end portion in the axial direction, and the other end portion is closer to the spring 96 than the end portion. The end portion of the spool 95 is in contact with a shaft 97 extending into an inside of the linear solenoid 10. A plunger 30 pushes the spool 95 through the shaft 97 such that the spool 95 moves in the axial direction.

The linear solenoid 10 has a coil assembly 20, the plunger 30, a yoke 35, and a stator core 40.

The coil assembly 20 has a bobbin 21, a coil 22, a terminal 23, and a molding resin 24. The bobbin 21 is made of resin and has a tubular shape. The coil 22 is constituted by an insulated conducting wire wound around the bobbin 21. The coil 22 generates a magnetic field when energized and provides a magnetic circuit passing through the stator core 40, the yoke 35, and the plunger 30. The terminal 23 connects to an external device for feeding the coil 22. The molding resin 24 is a post-formed resin and molds an outer surface of the coil 22. The molding resin 24 provides a connector 25 supporting the terminal 23.

The plunger 30 is made of a magnetic material and has a cylindrical shape. The plunger 30 is disposed inside of the bobbin 21 to be movable in the axial direction. The plunger 30 has a communication hole 31 passing through the plunger 30 in the axial direction. The spring 96 biases the plunger 30 toward a bottom portion 38 of the yoke 35 through the shaft 97 and the spool 95.

The yoke 35 is made of a magnetic material and has a cup shape. The yoke 35 covers an outer periphery of the coil 22. The yoke 35 has a tubular portion 36 having a notch 37 that is used to remove the terminal 23. The tubular portion 36 has an opening end portion that is opposite to the bottom portion 38, and the opening end portion is deformed such that the tubular portion 36 is fixed to the sleeve 94.

The stator core 40 is made of a magnetic material and has a cylindrical shape. The stator core 40 has a guiding portion 41, an attracting portion 42, and a blocking portion 45 that are integrally made.

The guiding portion 41 has a tubular shape and is located inside of the coil 22 and adjacent to the bottom portion 38 of the yoke 35 in the axial direction. The guiding portion 41 fits to an outer periphery of the plunger 30 in a radial direction and guides the plunger 30 to move in the axial direction. The guiding portion 41 has an end surface facing the bottom portion 38 of the yoke 35 in the axial direction. In the present embodiment, a ring member 46 made of a magnetic material and having an annular shape is disposed on an outer periphery of the guiding portion 41 to improve a magnetic coupling between the guiding portion 41 and the bottom portion 38.

The attracting portion 42 is located to be closer to the opening end portion of the tubular potion 36 than the bottom portion 38 of the yoke 35. The attracting portion 42 attracts the plunger 30 by generating a magnetic attractive force when the coil 22 is energized. The attracting portion 42 has a fitting hole 43 to which the plunger 30 fits when the plunger 30 is attracted to the attracting portion 42 and a flange 44 magnetically connected to the opening end portion of the tubular portion 36 of the yoke 35.

The blocking portion 45 is located between the guiding portion 41 and the attracting portion 42 in the axial direction and blocks a magnetic field (i.e., a magnetic force) between the guiding portion 41 and the attracting portion 42. In the present embodiment, the stator core 40 has a thin portion provided by being recessed radial-inward, and the thin portion provides the blocking portion 45. Accordingly, the blocking portion 45 can be thinner.

By the linear solenoid 10 having the above-described configuration, magnetic attractive force is not caused at the attracting portion 42 of the stator core 40 when the coil 22 is not energized. As a result, as shown in FIG. 1, the plunger 30 is pushed to the bottom portion 38 of the yoke 35 by biasing force applied from the spring 96.

When the coil 22 is energized, magnetic attractive force is caused at the attracting portion 42. Accordingly, the plunger 30 moves toward the attracting portion 42 against the biasing force applied from the spring 96. A stroke amount of the plunger 30 in the axial direction varies depending on an amount of electrical current flowing in the coil 22.

When the plunger 30 moves in the axial direction, a volume of an interior space of the stator core 40 varies depending on a volume of the shaft 97 located in the fitting hole 43. As shown in FIG. 3, a communication passage is defined to supply oil or air to the interior space of the stator core 40 of which volume is varied. Specifically, the communication passage is defined by a clearance 51 defined between the coil assembly 20 and the tubular portion 36 of the yoke 35, a communication groove 52 provided with the ring member 46, and a clearance 53 defined between the bottom portion 38 of the yoke 35 and the guiding portion 41 of the stator core 40.

A configuration of the linear solenoid 10 will be described referring to FIGS. 3 to 6.

Figure 3:
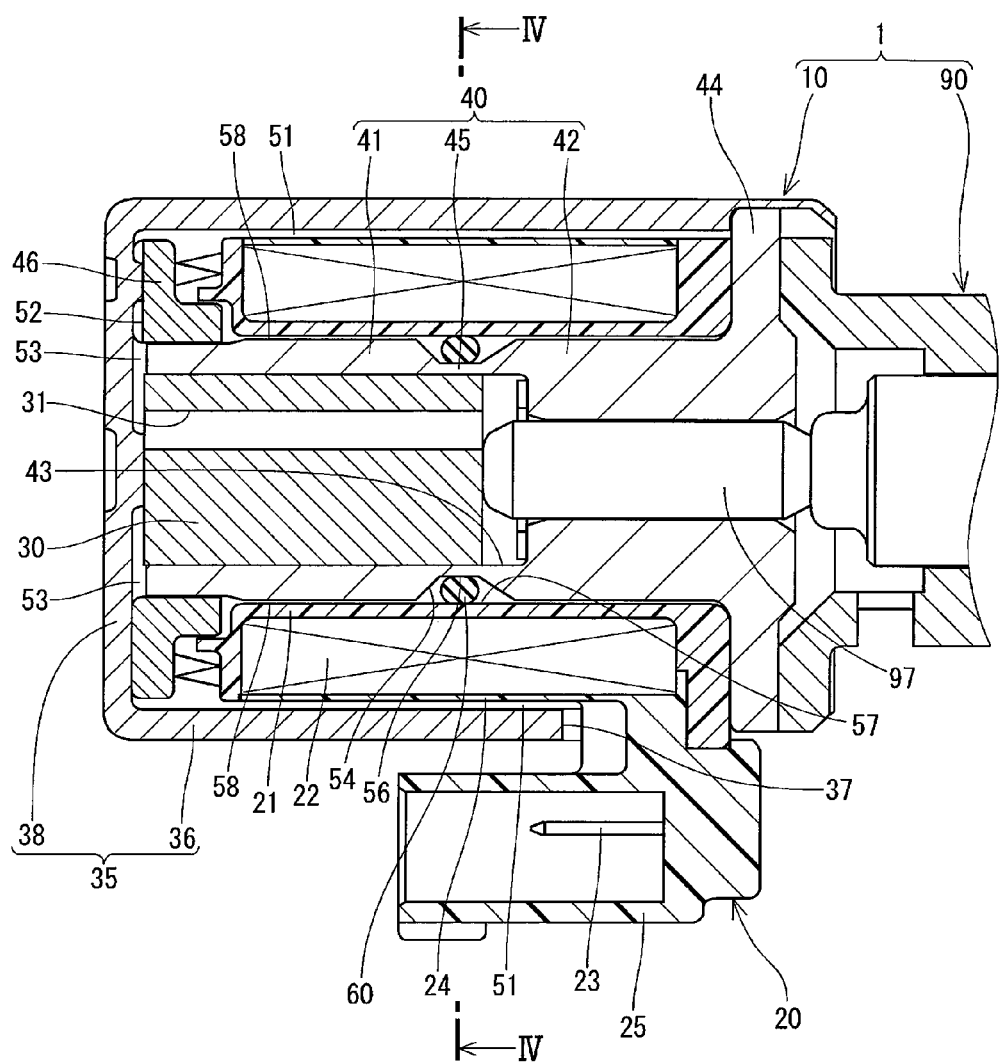
FIG. 3 is an enlarged view illustrating the linear solenoid.
Figure 4:
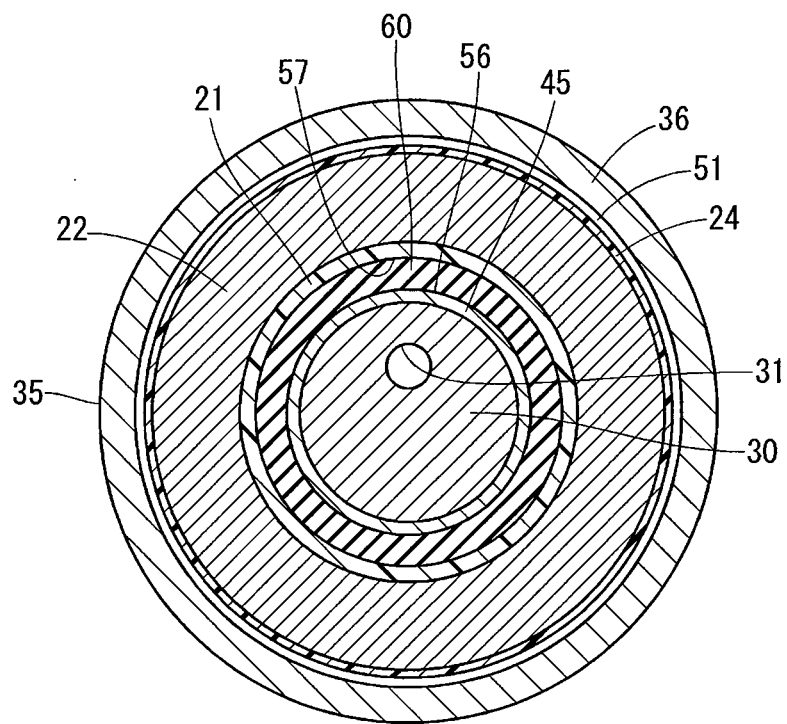
FIG. 4 is a sectional view taken along a line IV-IV shown in FIG. 3.

As shown in FIG. 3, an O-ring 60 (i.e., an elastic member) is disposed in a recessed portion 54 that has an annular shape and is located between the blocking portion 45 of the stator core 40 and the bobbin 21 in the radial direction. The O-ring 60 is made of a material such as rubber. As shown in FIGS. 3 and 4, the O-ring 60 is in contact with both an outer wall surface 56 of the blocking portion 45 and an inner wall surface 57 of the bobbin 21 constituting the coil assembly 20. Specifically, the O-ring 60 has a radial-inner periphery being in contact with the outer wall surface 56 of the blocking portion 45 on a radial-inner side of the O-ring 60 and a radial-outer periphery being in contact with the inner wall surface 57 of the bobbin 21 on a radial-outer side of the O-ring 60. In the present embodiment, the radial-inner periphery of the O-ring 60 is in contact with the outer wall surface 56 entirely in a circumferential direction of the O-ring 60, and the radial-outer periphery of the O-ring 60 is in contact with the inner wall surface 57 entirely in the circumferential direction. Moreover, a clearance 58 is defined between the stator core 40 and the bobbin 21 and communicates with the communication passage (i.e., the clearance 51, the communication groove 52, and the clearance 53). The O-ring 60 completely seals the clearance 58 at a location corresponding to the blocking portion 45.

Figure 5:
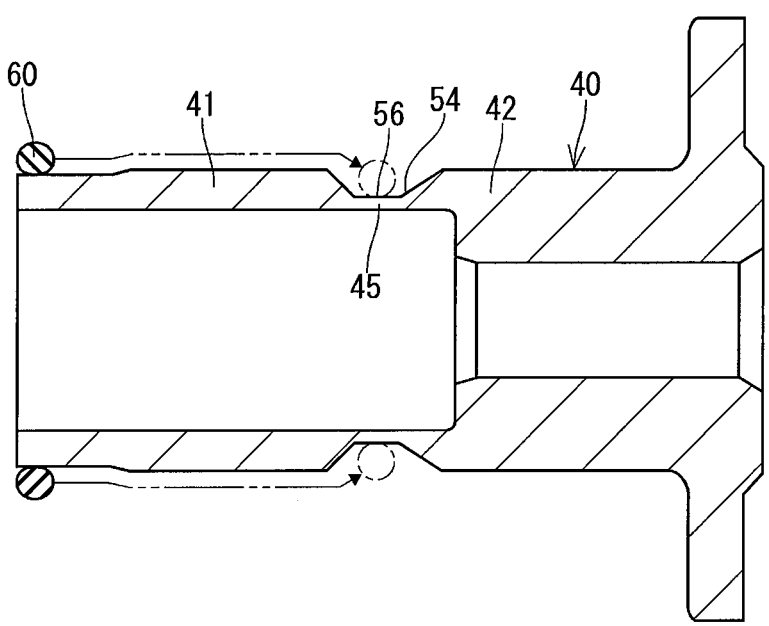
FIG. 5 is a view illustrating a manufacturing method in which an O-ring shown in FIG. 3 is attached to a stator core.
Figure 6:
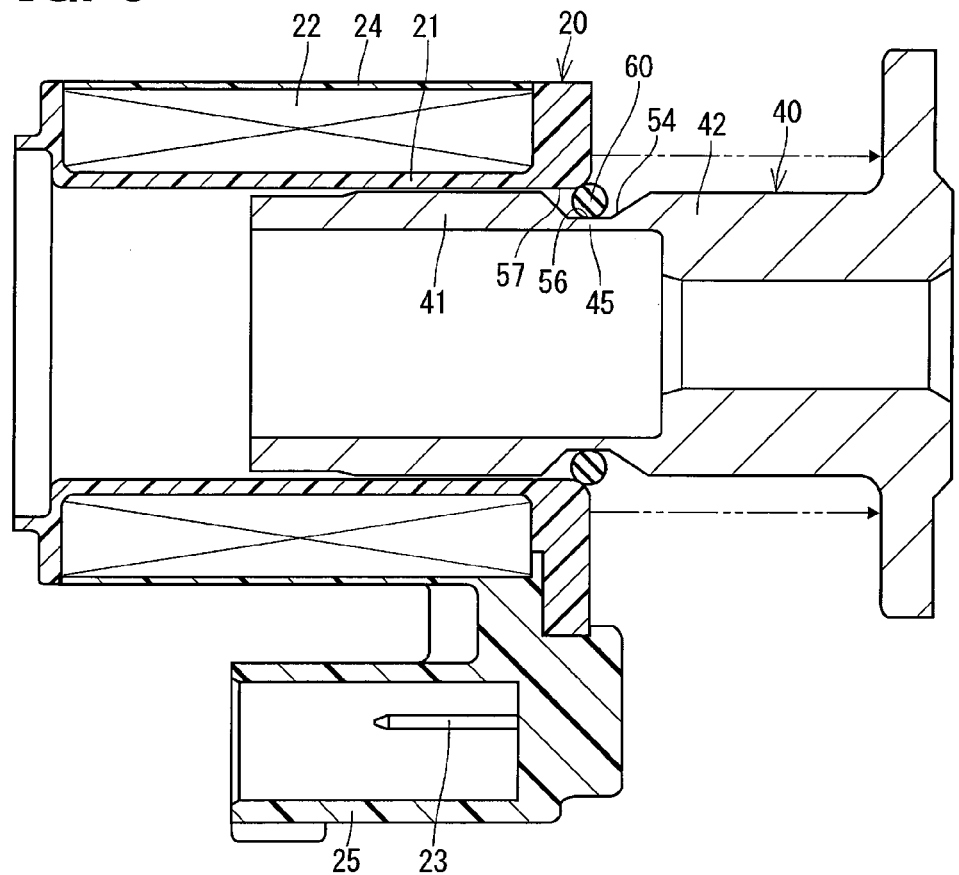
FIG. 6 is a view illustrating the manufacturing method shown in FIG. 5 in which a coil assembly is attached to the stator core.

As shown in FIG. 5, the O-ring 60 is attached to the stator core 40 from an end of the guiding portion 41 in an assembly. The O-ring 60 can be moved easily to the recessed portion 54 by being rolled once after the O-ring 60 is set at the end of the guiding portion 41. When the coil assembly 20 is set on an outside of the stator core 40 as shown in FIG. 6, the O-ring 60 is pressed in the radial direction between the inner wall surface 57 of the bobbin 21 and the outer wall surface 56 of the blocking portion 45. As a result, the O-ring 60 fits tightly both to the inner wall surface 57 and the outer wall surface 56. Furthermore, the radial-outer periphery of the O-ring 60 has a corner portion on the radial-outer side, and the corner portion has a round shape. Accordingly, the coil assembly 20 is inserted smoothly.

As described above, the O-ring 60 is disposed between the blocking portion 45 of the stator core 40 and the bobbin 21. The O-ring 60 has the radial-inner periphery being in contact with the outer wall surface 56 of the blocking portion 45 entirely in the circumferential direction and the radial-outer periphery being in contact with the inner wall surface 57 of the bobbin 21 entirely in the circumferential direction.

Therefore, foreign materials coming from the communication passage can be prevented from accumulating on the outer wall surface 56 of the blocking portion 45 or adhering on the inner wall surface 57 of the bobbin 21 to bridge the guiding portion 41 and the attracting portion 42. Thus, magnetic flux traveling between the guiding portion 41 and the attracting portion 42 while bypassing the plunger 30 can be prevented from increasing, and a decrease of magnetic attractive force of the stator core 40 can be suppressed.

The O-ring 60 completely seals the clearance 58 defined between the stator core 40 and the bobbin 21 at the location corresponding to the blocking portion 45. Accordingly, when the plunger 30 moves in the axial direction, oil or air does not flow in the clearance 51 between the guiding portion 41 and the attracting portion 42. Therefore, oil or air can be prevented from flowing into the clearance 51 from the communication passage.

In the present embodiment, the radial-outer periphery of the O-ring 60 has the corner portion having a round shape on a condition where the O-ring 60 is disposed to the outside of the blocking portion 45. Therefore, when the coil assembly 20 is set to the outside of the stator core 40 as shown in FIG. 6, the coil assembly 20 can be set smoothly. As a result, the O-ring 60 and the coil assembly 20 can be assembled easily.

In the present embodiment, the O-ring 60 is disposed as the elastic member. Since the O-ring is easy to get in the market, an increase of cost by adding the elastic member can be suppressed. The O-ring 60 can be moved easily to the recessed portion 54 by being rolled once after the O-ring 60 is set at the end of the guiding portion 41 as shown in FIG. 5. Therefore, the O-ring 60 and the stator core 40 can be assembled easily.

(Other Modification)

Figure 7:
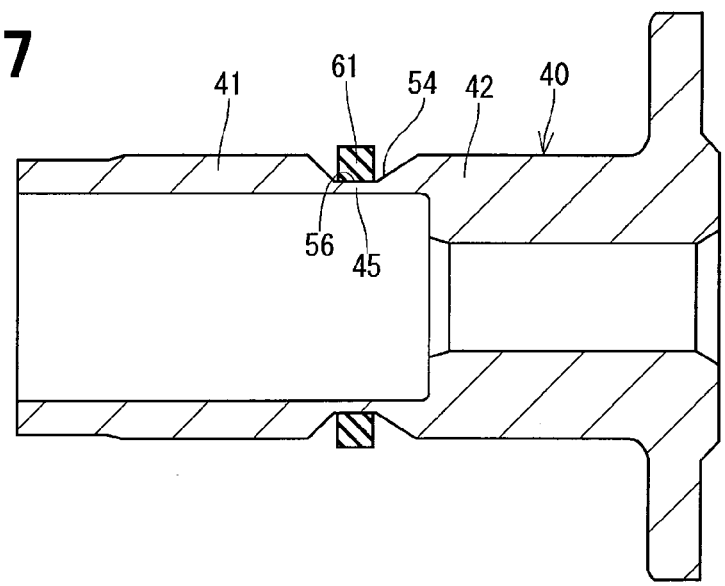
FIG. 7 is a view illustrating an O-ring attached to a stator core in a linear solenoid of a modification.

The elastic member is not limited to the O-ring. As shown in FIG. 7, the elastic member may be an elastic member 61 having a rectangular shape in cross section before disposed between the stator core and the bobbin. Alternatively, the elastic member may have a polygonal shape or an oblong shape in cross section. That is, the elastic member is only required to be in contact with the outer wall surface of the blocking portion and the inner wall surface of the bobbin.

Figure 8:
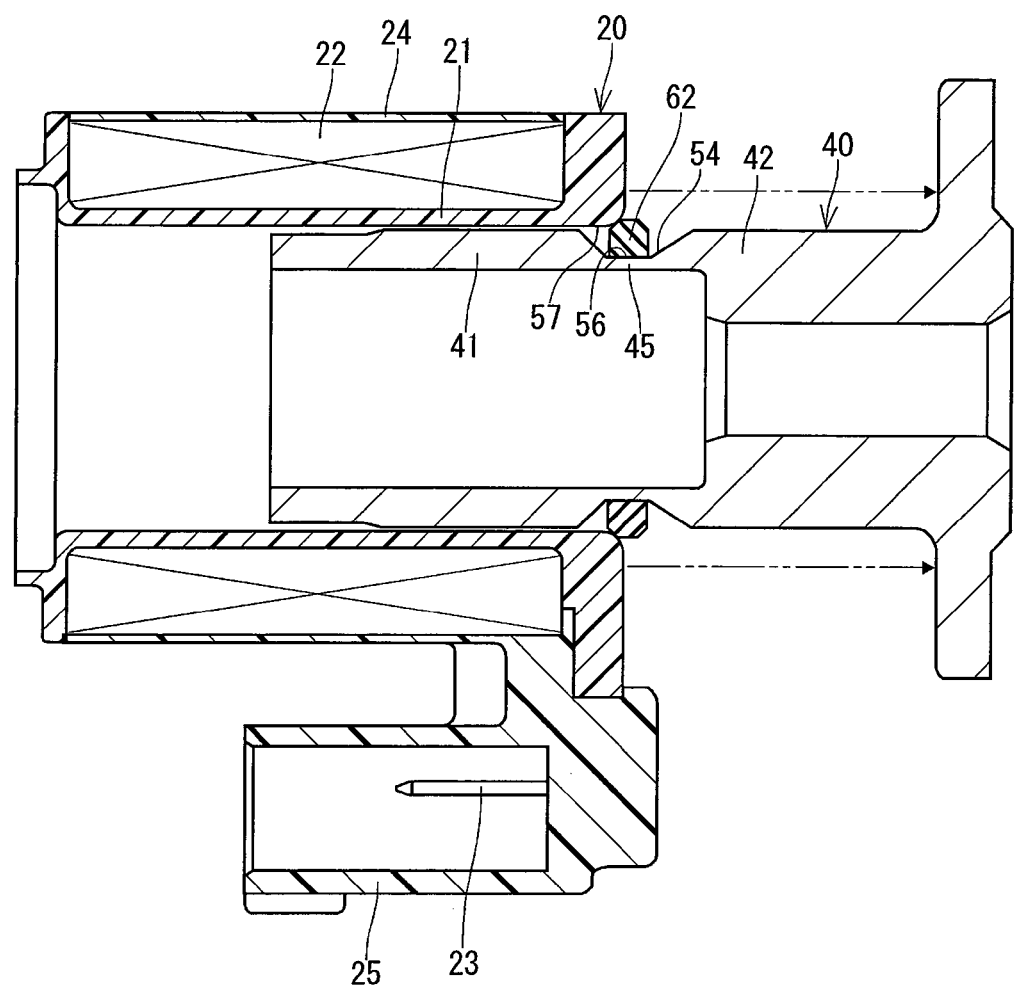
FIG. 8 is a view illustrating a stator core on a condition that a coil assembly is attached to the stator core according to a modification.

As another modification shown in FIG. 8, the elastic member may be an elastic member 62 having a corner portion that is chamfered on a radial-outer side of the elastic member 62. Even when the elastic member 62 is used, the coil assembly can be set to the stator core smoothly. The O-ring is not limited to be made of rubber and may be made of another material such as resin.

Such changes and modifications are to be understood as being within the scope of the present disclosure as defined by the appended claims.

While the present disclosure has been described with reference to a preferred embodiment thereof, it is to be understood that the disclosure is not limited to the preferred embodiment and constructions. The present disclosure is intended to cover various modifications and equivalent arrangements. In addition, while the various combinations and configurations, which are preferred, other combinations and configurations, including more, less or only a single element, are also within the spirit and scope of the present disclosure.

What is claimed is:

1. A linear solenoid comprising:
   a coil assembly having a coil that is provided by a conducting wire;
   a plunger disposed inside of the coil assembly and movable in an axial direction;
   a stator core having:
      a guiding portion fitting to an outer surface of the plunger and guiding the plunger to move in the axial direction;
      an attracting portion attracting the plunger by generating a magnetic attractive force when the coil is energized; and
      a blocking portion blocking a magnetic field between the guiding portion and the attracting portion; and
   a single elastic member comprising rubber and having an annular shape and disposed between the blocking portion and the coil assembly in a radial direction perpendicular to the axial direction, wherein
   the single elastic member has:
      a radial-inner periphery being in contact with an outer wall surface of the blocking portion in the radial direction entirely in a circumferential direction of the single elastic member; and
      a radial-outer periphery being in contact with an inner wall surface of the coil assembly in the radial direction entirely in the circumferential direction.

2. The linear solenoid according to claim 1, wherein
the single elastic member is disposed at a location corresponding to the blocking portion and completely seals a clearance defined between the stator core and the coil assembly.

3. The linear solenoid according to claim 1, wherein
the radial-outer periphery of the single elastic member has a corner portion on a radial-outer side of the single elastic member, and
the corner portion is chamfered or has a round shape.

4. The linear solenoid according to claim 1, wherein
the single elastic member is an O-ring.

5. The linear solenoid according to claim 1, wherein
the single elastic member is distanced from a sidewall surface of the guiding portion or a sidewall surface of the attracting portion in the axial direction.

6. The linear solenoid according to claim 1, wherein
no clearance is provided between the blocking portion and the single elastic member in the circumferential direction.

* * * * *